UNITED STATES PATENT OFFICE.

JOHN MONTGOMERIE, OF PARTICK, COUNTY OF LANARK, SCOTLAND.

MAKING MALTED BREAD.

SPECIFICATION forming part of Letters Patent No. 423,263, dated March 11, 1890.

Application filed June 18, 1889. Serial No. 314,763. (No specimens.) Patented in England March 27, 1886, No. 4,336.

*To all whom it may concern:*

Be it known that I, JOHN MONTGOMERIE, a subject of the Queen of Great Britain, residing at Partick, in the county of Lanark, Scotland, have invented certain new and useful Improvements in the Manufacture of Bread and Biscuits, (for which I have obtained a patent in Great Britain, No. 4,336, dated March 27, 1886;) and I do hereby declare that the following is a full, clear, and exact description thereof.

My invention has reference to certain new or improved special mixtures and mode of treatment of ground wheat, corn, or other flour or meal with other matters for the making of bread and biscuits or cakes, which will assist digestion, and be very light, agreeable, and nourishing food for people of weak digestion and for children and infants. By my said improvements the bread is prepared, as will be hereinafter described, from a mixture of wheat flour or meal and semolina, with "malt extract" or "maltine" treated in a novel and special manner, and the biscuits are prepared from the above three ingredients, with oat or corn flour or meal added thereto, while ordinary seasonings or other ingredients may be incorporated with these mixtures, as desired by the bakers or to suit the popular taste.

In order that the nature of my said invention and the mode of performing or carrying it into effect or practice may be properly understood, I will now proceed to describe the same in and by the following statement in writing.

My said invention or improvements comprise or consist all as follows: In and for the manufacture of bread I take about one-third of the quantity of flour or wheat-meal required for making the dough, as four pounds to each fourteen pounds of flour or meal used, and I add thereto a portion of water at a temperature of about 120° Fahrenheit, and put it into a suitable vessel and thoroughly mix the flour or wheat-meal and water together into a paste or batter. I then add a suitable quantity of extract of malt or maltine, about half that of the flour used in this mixture, and heat the vessel on a fire or place it into another vessel or boiler filled with hot water, and keep stirring the mixture until it rises to a temperature of between 130° and 150° Fahrenheit.

A suitable vessel for mixing and making this special preparation of malt extract would consist of a revolving cylinder with vanes in it for agitating the ingredients and mixture stated, which would be inserted and withdrawn through a screened door in the side, and this would be rotated within an outer close covered-in vessel with hot water in it, so as to be actuated by a handle or gearing from the outside while being treated and maintained at the temperatures described, so that the diastase or ptyaline of the malt extract will react on the insoluble starch of the flour and convert it into soluble dextrine, the reaction being starch plus extract of malt equals dextrine plus grape-sugar. I maintain the mixture for a few hours at the temperature of 130° to 150° Fahrenheit, to allow the diastase or ptyaline time to act upon the insoluble starch of the wheat or flour and convert the whole of it into soluble dextrine, as above described, and the mixture is then allowed to cool.

For making the bread I take this special prepared mixture of extract of malt and flour, and I add thereto the remainder of the flour or wheat-meal—say ten pounds—and the proper proportion of fermented sponge dough—say fourteen pounds—and a proportion of semolina equal to the weight of the malt extract used in the mixture to be used with carbonate or bicarbonate of soda, bitartrate of potash or cream of tartar, salt, and any other seasonings or materials required to suit the different classes of bread I am making, and I then dough or mix the whole ingredients together, and cut or divide and weigh it into loaves, and place these into tins or batch them in the oven in the usual way for batch bread.

Having thus described the nature of my said invention as applied to the manufacture of bread, I will now proceed to describe the mode of performing or carrying the same into effect or practice.

I have found the following proportions or quantities of materials very suitable in the manufacture of a brown fermented extract of malt bread, which I prepare as follows: In accordance with my said invention, I take four pounds of fine flour and about four quarts of water at a temperature of about 120° Fahrenheit. I then add two pounds of extract of malt or maltine, and place the whole in a suitable vessel, which is heated on a fire or placed into another vessel or boiler containing hot water, and I keep stirring the mixture and bring it up to a temperature of between 130° and 150° Fahrenheit, and maintain it at that temperature for a few hours to allow the diastase to act on the insoluble starch of the flour and convert it into soluble dextrine. After this prepared material becomes cool I mix it with the following ingredients: ten pounds rough wheat flour or meal, two pounds semolina, four ounces carbonate of soda, six ounces cream of tartar, one-half pound lard, fourteen pounds fermented roll or batch dough, and one and one-half ounce salt, with the addition of any other desired ingredients or seasonings. I then thoroughly knead the whole mixture together and cut or divide and weigh it into loaves of suitable size, and bake these in tins or in batches in a not too hot oven.

In preparing fine extract of malt or maltine loaf bread, very suitable for invalids where wheat-meal is considered irritable, I do so in the same manner and take the same ingredients as for the brown bread, but substitute fine wheat-flour for the wheaten meal.

In preparing an ordinary batch of white loaf bread according to my improvements, I set the sponge in the usual way, with a portion of the water required and barm or yeast, and I take about one-third of the flour and the remainder of the water that is required to make the full quantity of dough and treat it in the same manner with the special mixture of extract of malt or maltine, as hereinbefore described.

My improvements as described are also applicable to unfermented bread as well as to fermented bread, only substituting flour dough for the fermented batch dough.

In the manufacture of biscuits my said invention or improvements consist as follows: In preparing the dough for the manufacture of good digestive biscuits in accordance with my improvements, I take the extract of malt or maltine with the wheaten flour or meal in the proportions of from one pound to two pounds, to three pounds to four pounds, by weight, and the quantity of water required to bring the mixture to a pasty consistency, and put it through the same process as hereinbefore described for the manufacture of loaf bread, with the addition of a proportion of oat or corn flour, but without the fermented sponge dough. When this mixture becomes cool, I dough or mix all together, adding butter or lard, sugar, and any other ingredients that may be desired by the bakers or to suit the popular taste. The dough is afterward kneaded and baked and rolled out and cut into biscuits in the ordinary manner, as is usual in the manufacture of other biscuits.

In making biscuits in accordance with my said improvements, I find the following proportions or quantities of ingredients most suitable, and I proceed as follows: To twelve pounds of fine wheat flour or meal I add about five quarts of warm water at a temperature of about 120° Fahrenheit, to bring it to a pasty consistency. I then add six pounds of extract of malt or maltine and place the mixture in a suitable vessel and bring it up to a temperature of between 130° and 150° Fahrenheit, and keep stirring it all the time, and I allow it to stand at that temperature for, say, a few hours and then allow it to cool. I then add to this extract-of-malt mixture the following ingredients: four pounds of semolina, two and one-half pounds oat-flour, twenty-four pounds wheat-meal or rough flour, eight ounces of carbonate of soda, twelve ounces of cream of tartar, seven and one-half pounds of butter or lard, one pound of sugar, and two ounces of salt, with the addition of any other desired ingredients or seasonings. I afterward mix all the ingredients together, and knead and roll out the dough, and divide or cut it and bake it into biscuits, all otherwise in an ordinary manner.

In preparing a fine nursery biscuit I treat the extract of malt or maltine in the same manner as described for the digestive biscuit, and use the same ingredients, but substitute fine dressed wheat-flour for the rough wheat flour or meal.

In preparing a dough for the manufacture of extract-of-malt rusk bread in accordance with these my improvements, I take for preparing the extract-of-malt mixture four pounds of fine wheat-flour, two quarts of water, three pounds of extract of malt or maltine, and put the mixture through the same process as described for the manufacture of bread and biscuits, and when cool I mix it with the following ingredients: twelve pounds of roll or batch fermented dough, one pound of butter, and one and one-half pound of semolina, while eggs, sugar-of-milk, and other seasonings may be added as desired.

I make a bread food for infants or delicate children by grinding my said rusk bread or fine biscuits into a flour or meal, and place it into tins for preservation and use.

Although I have given special mixtures of ingredients for making the doughs of brown and white extract-of-malt bread and extract-of-malt biscuits to be mixed with my special preparation or mixture of extract of malt or maltine, it will be understood that my preparation of malt extract may be used with ordinary mixtures of doughs for bread and about one-half for biscuits.

Having thus particularly described and ascertained the nature of my said invention and in what manner the same is to be performed, I declare that what I claim is—

The mode herein described of making bread, consisting in first mixing flour, water, and extract of malt or maltine, heating the mixture in a water-bath to 130° to 150° Fahrenheit with agitation, maintaining it at that temperature for a few hours until the diastase acts on the starch and converts it into soluble dextrine and sugar, then making a dough of this compound by further addition of flour, and subsequently forming and baking the same, all substantially as described.

In testimony that I claim the foregoing I have hereunto set my hand this 11th day of April, 1888.

JOHN MONTGOMERIE.

Witnesses:
 ARCH. SHARP,
  *Of 278 Dumbarton Road, Partick, Solicitor.*
 WM. YUILL UTMAR,
  *Of 278 Dumbarton Road, Partick, Clerk at Law.*